United States Patent
Zhao et al.

(10) Patent No.: US 7,558,763 B2
(45) Date of Patent: Jul. 7, 2009

(54) IMAGE VERIFICATION METHOD, MEDIUM, AND APPARATUS USING A KERNEL BASED DISCRIMINANT ANALYSIS WITH A LOCAL BINARY PATTERN (LBP)

(75) Inventors: Jiali Zhao, Beijing (CN); Seokcheol Kee, Seoul (KR); Haitao Wang, Seoul (KR); Haibing Ren, Seoul (KR); Wonjun Hwang, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 391 days.

(21) Appl. No.: 11/454,913

(22) Filed: Jun. 19, 2006

(65) Prior Publication Data

US 2007/0112699 A1  May 17, 2007

(30) Foreign Application Priority Data

Jun. 20, 2005 (KR) ............... 10-2005-0053154

(51) Int. Cl.
*G06F 15/18* (2006.01)
(52) U.S. Cl. ....................................... 706/14
(58) Field of Classification Search ............... None
See application file for complete search history.

(56) References Cited

U.S. PATENT DOCUMENTS

| | | | | |
|---|---|---|---|---|
| 7,027,627 | B2 * | 4/2006 | Levin et al. | 382/128 |
| 7,129,095 | B2 * | 10/2006 | Boehr et al. | 436/151 |
| 7,499,576 | B2 * | 3/2009 | Setala | 382/128 |

OTHER PUBLICATIONS

Automatic medical image categorization and annotation using LBP and MPEG-7 edge histograms Guangjian Tian; Hong Fu; Feng, D.D.; Technology and Applications in Biomedicine, 2008. ITAB 2008. International Conference on May 30-31, 2008 pp. 51-53 Digital Object Identifier 10.1109/ITAB.2008.4570523.*

(Continued)

*Primary Examiner*—Michael B Holmes
(74) *Attorney, Agent, or Firm*—Staas & Halsey LLP

(57) ABSTRACT

A image verification method, medium, and apparatus using a local binary pattern (LBP) discriminant technique. The verification method includes generating a kernel fisher discriminant analysis (KFDA) basis vector by using the LBP feature of an input image, obtaining a Chi square inner product by using the LBP feature of an image registered in advance and a kernel LBP feature and projecting to a KFDA basis vector, obtaining a Chi square inner product by using the LBP feature of a query image and a kernel LBP feature and projecting to a KFDA basis vector, and obtaining the similarity degree of the target image and the query image that are obtained as Chi square inner product results, and projected to the KFDA basis vector. According to the method, medium, and apparatus, the KFDA based LBP shows superior performance over conventional LBP, KFDA, and biometric experimentation environment (BEE) baseline algorithms.

29 Claims, 5 Drawing Sheets

OTHER PUBLICATIONS

Automatic age classification with LBP Gunay, A.; Nabiyev, V.V.; Computer and Information Sciences, 2008. ISCIS '08. 23rd International Symposium on Oct. 27-29, 2008 pp. 1-4 Digital Object Identifier 10.1109/ISCIS.2008.4717926.*

LBP Discriminant Analysis for Face Verification Jiali Zhao; Haitao Wang; Haibing Ren; Seok-Cheol Kee; Computer Vision and Pattern Recognition, 2005 IEEE Computer Society Conference on 25-25 Jun. 2005 pp. 167-167 Digital Object Identifier 10.1109/CVPR. 2005.580.*

Ojala, et al., "Multiresolution Gray-Scale and Rotation Invariant Texture Classification with Local Binary Patterns", IEEE Transactions on Pattern Analysis and Machine Intelligence, Jul. 2002, vol. 24, No. 7, pp. 971-987.

Ojala, et al., "A Comparative study of Texture Measures With Classification Based on Feature Distributions", Pattern Recognition, 1996, vol. 29, No. 1, pp. 51-59.

* cited by examiner

EXAMPLE　　　　　THRESHOLD　　　　　PATTERN $(10011010)_2 = 154$

IMAGE VERIFICATION METHOD, MEDIUM, AND APPARATUS USING A KERNEL BASED DISCRIMINANT ANALYSIS WITH A LOCAL BINARY PATTERN (LBP)

CROSS-REFERENCE TO RELATED APPLICATIONS

This application claims the benefit of Korean Patent Application No. 10-2005-0053154, filed on Jun. 20, 2005, in the Korean Intellectual Property Office, the disclosure of which is incorporated herein in its entirety by reference.

BACKGROUND OF THE INVENTION

1. Field of the Invention

Embodiments of the present invention relate to a recognition technology, and more particularly, to a face image verification method, medium, and apparatus using a kernel based discriminant analysis with local binary pattern (LBP) extraction.

2. Description of the Related Art

Recently, there has been an increased need and/or desire for entrance cards or devices to identify those at airports or attempting to enter buildings or restricted areas, but according to such conventional methods, a key card or key pad given to each person must be used in combination with a card reader to verify the identification information. This results in an inconvenience in that the key card or key pad should always be carried and may even cause a security problem if stolen or lost.

In order to minimize such potential negative aspects, there has been increased interest in biometric technologies that can automatically identify or confirm an individual's identity using biological or behavioral characteristics of the individual. In addition to potentially replacing the need for passwords for a cash withdrawal card or entrance cards for access to buildings or restricted areas, the use of reliable biometric systems has been expanding to include more general applications such as those requiring a high level caution, such as in a safe of a bank, a security system of a company or an airport, and future interfaces between man and machine. For this, many research projects to implement a more convenient and reliable system have been conducted.

Biometric systems and technology use a measurable physical characteristic or personal characteristic in order to verify a personal characteristic or to identify a person. The personal characteristic in the biometric technology may not be stolen, leaked to others, lost, or changed. Accordingly, it may provide advantages enabling a perfect audit function, such as tracking exactly who may infringe a security system.

Among personal characteristics that may be used to implement such a biometric system, there are a person's fingerprints, face, palmprints, particular hand geometries, thermal images, voice characteristics, signatures, vein arrangements, keystroke typing dynamics, retinas, and irises. In particular, it has been found that face recognition is a biometric technology that is most natural and generates relatively the least discomfort since a person's face or appearance is normally most frequently used to identify the person.

However, since conventional face recognition technology identifies people by comparing the characteristics of the contour of a face, there is a potential problem of incorrect recognition that different people may be identified as the same person, and an identical person may be determined to be a different person, e.g., due to the effects of illumination, facial expression, and posture.

SUMMARY OF THE INVENTION

Embodiments of the present invention include a face verification method, medium, and apparatus using a local binary pattern (LBP) discriminant method, using as a classifier a kernel Fisher discriminant analysis (KFDA) having an LBP feature extraction method, in order to improve the verification performance of the LBP.

Additional aspects and/or advantages of the invention will be set forth in part in the description which follows and, in part, will be apparent from the description, or may be learned by practice of the invention.

To achieve the above and/or other aspects and advantages, embodiments of the present invention include a similarity determining method using local binary pattern (LBP) discrimination, including obtaining a target Chi square inner product based on a target LBP feature of a target image and a target kernel LBP feature to generate a target image feature vector, projecting the target image feature vector to a kernel fisher discriminant analysis (KFDA) basis vector, obtaining a query Chi square inner product based on a query LBP feature of a query image and a query kernel LBP feature to generate a query image feature vector, projecting the query image feature vector to the KFDA basis vector, and providing a similarity degree between the target image and the query image based on the projected target image feature vector and the projected query image feature vector.

The target kernel LBP feature and query kernel LBP feature may be a same kernel LBP feature.

The method may further include generating the KFDA basis vector by using at least one training LBP feature of at least one training image.

Here, the generating of the KFDA basis vector may include obtaining the at least one training LBP feature of the at least one image, obtaining the training kernel LBP feature, obtaining a training Chi square inner product by using the at least one training LBP feature and the training kernel LBP feature, and obtaining the KFDA basis vector by performing a KFDA for the training Chi square inner product.

The training kernel LBP feature, the target kernel LBP feature, and query kernel LBP feature may be the same kernel LBP feature.

In addition, in the obtaining of the similarity degree, the similarity degree may be determined by comparing Euclidian distances.

Further, at least one of the training Chi square inner product, the target Chi square inner product, and the query Chi square inner product may be obtained by performing a following kernel equation:

$$k(x, y) = \exp\left(-\frac{\chi^2(x, y)}{2\sigma^2}\right)$$

where $$\chi^2(x, y) \text{ is defined by } \chi^2(S, M) = \sum_i \frac{(S_i - M_j)^2}{S_i + M_i}.$$

Here, in the obtaining of the at least one training LBP feature of the at least one training image, the at least one training LBP feature may be expressed as a corresponding LBP histogram by performing a corresponding LBP operation for the at least one training image.

In addition, at least one of the target Chi square inner product and the query Chi square inner product is obtained by performing a following kernel equation:

$$k(x, y) = \exp\left(-\frac{\chi^2(x, y)}{2\sigma^2}\right)$$

where $$\chi^2(x, y) \text{ is defined by } \chi^2(S, M) = \sum_i \frac{(S_i - M_j)^2}{S_i + M_i}.$$

Here, in the obtaining of the similarity degree, the similarity degree may be determined by comparing Euclidian distances.

Further, the method may be a face similarity determination method and the similarity degree is a similarity degree of a target face image and a query face image.

The target image may further be pre-registered before receipt of the query image.

To achieve the above and/or other aspects and advantages, embodiments of the present invention include a similarity determining apparatus using a local binary pattern (LBP) discriminant method, including a target image Chi square inner product unit to obtain a target Chi square inner product based on a target LBP feature of a target image and a target kernel LBP feature to generate a target image feature vector, a target image KFDA projection unit to project the target image feature vector to a kernel fisher discriminant analysis (KFDA) basis vector, a query image Chi square inner product unit to obtain a query Chi square inner product based on a query LBP feature of a query image and a query kernel LBP feature to generate a query image feature vector, a query image KFDA projection unit to project the query image feature vector to the KFDA basis vector, and a similarity degree acquisition unit to compare the projected target image feature vector and the projected query image feature vector and provide a similarity degree between the target image and the query image.

Here, the target kernel LBP feature and query kernel LBP feature may a same kernel LBP feature.

In addition, the method may include a basis vector generation unit to generate the KFDA basis vector by using at least one training LBP feature of at least one training image. The basis vector generation unit may include a training image Chi square inner product unit to obtain a training Chi square inner product based on at least one training LBP feature of at least one training image and a training kernel LBP feature, and a KFDA basis vector generation unit to generate the KFDA basis vector by performing a KFDA for a result of the training image Chi square inner product unit.

The training kernel LBP feature, the target kernel LBP feature, and query kernel LBP feature may further be the same kernel LBP feature.

In addition, here, at least one of the training Chi square inner product, the target Chi square inner product, and the query Chi square inner product may be obtained by performing a following kernel equation:

$$k(x, y) = \exp\left(-\frac{\chi^2(x, y)}{2\sigma^2}\right)$$

where $$\chi^2(x, y) \text{ is defined by } \chi^2(S, M) = \sum_i \frac{(S_i - M_j)^2}{S_i + M_i}.$$

In addition, the at least one training LBP feature of the at least one training image may be expressed as a corresponding LBP histogram by performing a corresponding LBP operation for the at least one training image.

Further, the similarity degree of the similarity degree acquisition unit may be determined by comparing Euclidian distances.

In addition, at least one of the target Chi square inner product and the query Chi square inner product may be obtained by performing a following kernel equation:

$$k(x, y) = \exp\left(-\frac{\chi^2(x, y)}{2\sigma^2}\right)$$

where $$\chi^2(x, y) \text{ is defined by } \chi^2(S, M) = \sum_i \frac{(S_i - M_j)^2}{S_i + M_i}.$$

Further, here, the similarity degree of the similarity degree acquisition unit is determined by comparing Euclidian distances.

The apparatus may be a face similarity determination apparatus and the similarity degree acquisition unit determines a similarity degree of a target face image and a query face image.

The target image may also be pre-registered before receipt of the query image.

To achieve the above and/or other aspects and advantages, embodiments of the present invention include a similarity determining method using local binary pattern (LBP) discrimination, including projecting a LBP based query image feature vector to a kernel fisher discriminant analysis (KFDA) basis vector, and providing a similarity degree between a target image and the query image based on a projected target image feature vector and the projected LBP based query image feature vector.

The method may further include generating the LBP based query image feature vector through a Chi square square inner product of a query LBP feature of the query image and a query kernel LBP feature.

The projected target image feature vector may be a LBP target image feature vector generated through a Chi square square inner product of a target LBP feature of the target image and a target query kernel LBP feature.

To achieve the above and/or other aspects and advantages, embodiments of the present invention include a medium including computer readable code to implement embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
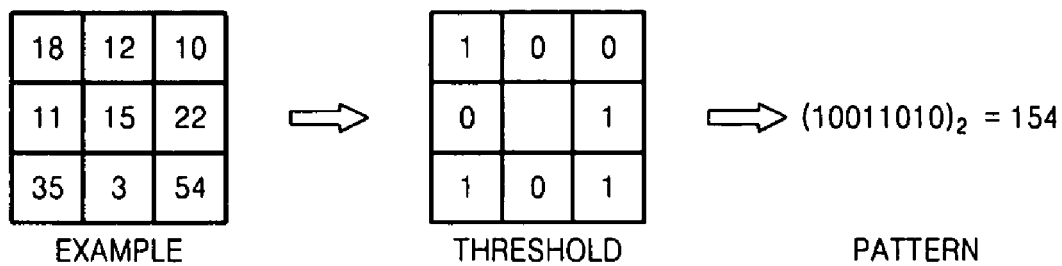
FIG. 1 illustrates an example basic local binary pattern (LBP)

Reference will now be made in detail to embodiments of the present invention, examples of which are illustrated in the accompanying drawings, wherein like reference numerals refer to the like elements throughout. Embodiments are described below to explain the present invention by referring to the figures.

Major stages for verification or recognition of a face include extraction of features of a face and the design of a corresponding classifier.

The aim of the extraction of the feature of a face is to extract facial features less sensitive to changes in facial expressions, illumination and occlusion in different images for the same person. Face feature extraction techniques that have recently attracted attention include the local binary pattern (LBP) and Gabor wavelets, which have been showing good performances in this field.

LBP expresses a face image through consideration of both shape and texture information. In the LBP, a face feature vector (histogram) can be directly extracted from a face image.

The face image is first divided into regions (windows) from which the separate LBP face feature extractions are collected. The regions are then connected, or concatenated, into a single feature histogram to efficiently express the face image as a whole.

Textures of each face region are locally encoded by separate LBP patterns while the entire face is restored by construction of a face feature histogram by combination of the resultant LBP patterns. The basic idea behind using the LBP feature is that a face image can be shown as a combination of micro patterns which may not change in relation to monotonic grey scale transformation, i.e., there is a greater chance that the separate regions will not change between different images of the same person, even if the illumination of the image changes, orientation of the face changes, or even if there is a lapse in time between images. By combining these micro patterns, the face image can be globally described.

As a classifier having an LBP feature extraction method, a discriminant analysis may be used to improve the performance and face verification.

In particular, there have previously been attempts to use LBP with linear discriminant analysis (LDA), i.e., using LBP as a feature descriptor and LDA as the classifier, but the resultant performance was worse than the LBP method alone. One such common LDA is the Fisher linear discriminant analysis (FLDA).

After a detailed analysis of this problem, the present inventors discovered that in such an LBP based LDA method it was difficult to take advantage of LBP's Chi square statistic similarity measures. It was further determined that this difficulty was a result of the LDA using a Euclidian distance which is quite different from the LBP histogram based Chi square distance.

Accordingly, it was found that if a kernel based nonlinear discriminant analysis, e.g., a kernel Fisher discriminant analysis (KFDA), was combined with the application of the LBP, then the combination would have all the advantages of LDA and all the advantages of LBP, including LBP's histogram feature which is robust to expression and illumination, as well as LBP's Chi square statistic similarity measures which are suitable distance measures for the histogram.

Thus, the KFDA (nonlinear kernel Fisher discriminant analysis) combines the advantages of a kernel and the FLDA (linear Fisher discriminant analysis) so that input data is projected to an implicit feature space F, where the FLDA can be performed on F to generate a nonlinear discriminant feature of the input data.

Thus, with this process, the inventors have overcome the aforementioned drawbacks of matching LBP and LDA.

Here, in order to successfully use the KFDA having the LBP, embodiments of the present invention use a measurement of the Chi square statistic similarity and calculate the inner product of two vectors in F with another kernel function.

As noted above, with this new method, the advantages of the LBP feature and similarity feature can be combined with the advantages of LDA. In addition, a KFDA based LBP has a better performances than both the LBP and KFDA when implemented alone.

To more clearly understand embodiments of the present invention, first, the LBP to select a facial feature will be explained. The original LBP operator is a strong way to describe a texture of a face, as well as being a multi-resolution approach efficient for texture classification invariant to gray scales and rotation.

In order to extract a facial feature which is not affected by changes in illumination, the aim of the LBP is to find a facial feature that does not change with respect to gray scale movements.

A conventional LBP had a center pixel of 3×3 pixels, as a threshold, and expressed values of the pixels neighboring the center pixel in binary and attached labels to the pixels of an image. Then, the histogram of each label was used as a texture descriptor. FIG. 1 illustrates examples of such basic LBP operators.

Figure 2A:
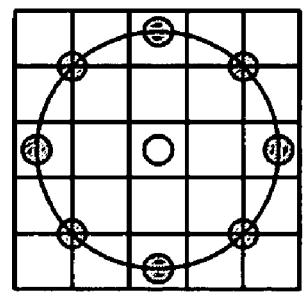
FIGS. 2A and 2B illustrate examples of LBP pattern (P, R) notations, with FIG. 2(A) illustrating circular (8,2) neighbors and FIG. 2(B) illustrating circular (8,3) neighbors.
Figure 2B:
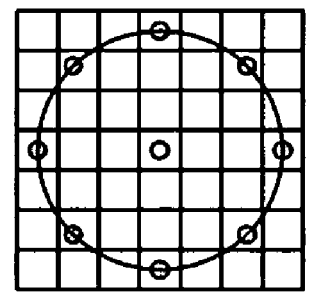

In order to capture a large scale structure, which may be a major feature of a texture, an LBP can be expanded by using neighbor pixels of different sizes. By using circular neighbors and binary linear interference, pixel values may be based on a radius in a region (or window) and the placement of the corresponding neighboring pixels. Thus, in relation to neighbor pixels, the LBP uses a (P, R) notation indicating P sampling points existing on a circle with radius R. FIGS. 2(A) and 2(B) illustrate examples of the (P, R) notation, e.g., with FIG. 2(A) showing circular (8,2) neighbors and FIG. 2(B) showing circular (8,3) neighbors. As another example, a circular (16,2) arrangement would have 16 sampling points on a circle with a radius of 2.

A so-called uniform pattern is used for another expansion for the original operator. When a binary string indicates a circle and at most two bitwise transformations (transformation from 0 to 1 or 1 to 0), an LBP is said to be uniform. For example, 00000000, 00011110, and 10000011 are uniform patterns.

Thus, a uniform circular structure has one common pattern and has been called 'uniform'. A uniform circular structure has a very small number of space transitions, and functions as a template for a microstructure, for example, a bright spot, flat area, or dark spot and an edge of a varying positive or negative curvature.

Figure 3:
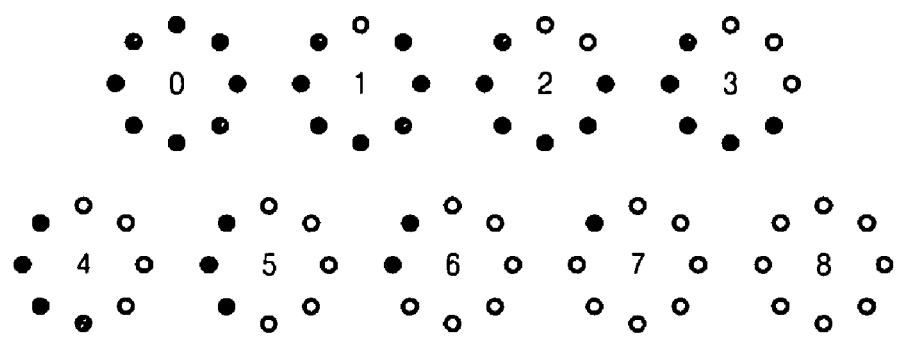
FIG. 3 illustrates 9 uniform rotation invariable binary patterns.

In an experiment with a texture image, uniform patterns account for slightly less than 90% of all patterns when using an (8,1) neighborhood and for around 70% in a (16,2) neighborhood. FIG. 3 illustrates 9 uniform rotation invariable binary patterns. Further discussions on such uniform structures can be found *Multiresolution gray-scale and rotation invariant texture classification with local binary patterns*, Ojala, T, Pietikäinen, M., Mäenpää, T., IEEE Transactions on Pattern Analysis and Machine Intelligence 24 (2002) 971-987; and *A comparative study of texture measures with classification based on feature distributions*, Ojala, T., Pietikäinen, M., Harwood, D, Pattern Recognition 29 (1996) 51-59.

As a further example, the illustrated numeral within each pattern of FIG. 3 corresponds to that pattern's unique $LBP_{8,r}^{riu2}$ code.

In order to perform an LBP operation for face recognition, LBP has been used without a rotation invariant feature, as a face descriptor, that is, $LBP_{P,R}^{u2}$ as discussed in *Face recognition with local binary patterns*, Ahonen, T, Hadid, A., and Pietikäinen, M., ECCV (2004), and in *Face recognition based on the appearance of local regions*, Ahonen, T, Pietikäinen, M., Hadid, A., Mäenpää, T, ICPR (2004).

Here, the subscript represents using the operation in a (P,R) neighborhood. Superscript u2 represents using uniform patterns and labeling all remaining patterns with a single label.

The face descriptor uses the histograms of the labels. Embodiments of the present invention may utilize such a form of $LBP_{8,2}^{u2}$.

All LBP values are quantized as 59 bins (separate labels) according to a uniform strategy. The 59 bins are obtained according to the following process. Each of codes 1 through 7 has 8 rotated patterns, as shown in FIG. 3. As a total, the uniform patterns total 7*8=56bins. Since plus code 0, 8 and other non-uniform patterns are treated as one unique bin, the total number becomes 56+3=59 bins.

Accordingly, a histogram of a labeled image fi(x, y) can be defined as the following Equation 1.

Equation 1:
$$H_i = \sum_{x,y} I\{f_l(x, y) = i\}, i = 0, \ldots, n-1 \quad (1)$$

Here, n=59 is the number of different labels generated by the LBP operator taking the following Equation 2 into consideration.

Equation 2:
$$I\{A\} = \begin{cases} 1, & A \text{ is true} \\ 0, & A \text{ is false} \end{cases} \quad (2)$$

This histogram of the LBP contains information about the distribution of the local micropatterns, such as edges, spots and flat areas, over the whole image. For efficient face representation, spatial information may also be retained. For this purpose, the image can be divided into regions $R_0, R_1, \ldots R_{m-1}$, and the spatially enhanced histogram can further be defined in the following Equation 3.

Equation 3:
$$H_{i,j} = \sum_{x,y} \{f_l(x, y) = i\} I\{(x, y) \in R_j\} \quad (3)$$
$$i = 0, \ldots, n-1; j = 0, \ldots, m-1$$

This histogram effectively describes three different levels of locality. The labels for the histogram contain information about the patterns on a pixel level, the labels are summed over a small region to produce information on a regional level, and the regional histograms are concatenated to build a global description of the face.

Face verification may be performed by calculating the similarity of two face images. Accordingly, the following Chi square statistic similarity measures (Equation 4) have been suggested for such a LBP histogram.

Equation 4:
$$\chi^2(S, M) = \sum_i \frac{(S_i - M_j)^2}{S_i + M_i} \quad (4)$$

Here, S and M are the LBP histograms of two images being compared.

Such LBP face recognition methods have achieved promising results in FERET tests, which tests face recognition methods against a predefined database of sample images.

As noted above, the inventors have discovered that it is further possible to use a kernel nonlinear discriminant analysis method as a classifier with LBP descriptor for further performance of the verification.

A Fisher linear discriminant analysis (FLDA) has been well known as a method for pattern classification in the face recognition field. The FLDA maximizes a Fisher discriminant function and obtains a linear projection, to maximize between-class scatter SB and to minimize within-class scatter SW.

This FLDA is shown as Equation 5:

$$J(w) = \arg\max_w \frac{w^T S_B w}{w^T S_W w} \quad (5)$$

In embodiments of the present invention, a discriminant analysis criterion is used to improve the LBP performance. However, the aforementioned problem exists with using FLDA with LBP, that is, that if the FLDA is directly used, it is difficult to use the Chi square statistic similarity employed by the LBP histogram.

Another problem of the FLDA is that as a linear expression method, the FLDA is not appropriate to describe a complicated nonlinear transformation in an actual face image if facial expressions and illuminations change.

However, according to Cover's theorem on pattern separation, patterns that are separated nonlinearly can be separated linearly with a high probability if the patterns are transformed nonlinearly from an input space to a high-order feature space. Said another way, a complex pattern-classification problem cast in a high-dimensional space nonlinearly is more likely to be linearly separable than in a low-dimensional space. In particular, a binary classification is φ-separable if there is an m-dimensional function vector ϕ that cast the inputs into a m-dimensional space, where the classification is linearly separable by the hyperplane $w^T\phi(x)=0$, where w is the weight vector associated to an output neuron. This hyperplane is called the separation surface in a network.

A kernel based nonlinear discriminant analysis has been proposed that combines a kernel trick and the FLDA. The nonlinear kernel trick is employed first to project input data to an implicit feature space F, and then FLDA is performed in F to produce nonlinear discriminant features of the input data. This is referred to as kernel Fisher discriminant analysis (KFDA).

In the present invention, a modified KFDA with an LBP is used to improve face verification in order to obtain the advantage of the Chi square statistics for the histogram of the LBP.

The concept of the KFPD is to solve the problem of the FLDA in the implicit feature space F constructed by a non-linear mapping, as shown in Equation 6 below.

Equation 6:

$$\phi: x \in R^N \to \phi(x) \in F \qquad (6)$$

In implementing Equation 6, implicit feature vector ϕ is not needed to be calculated explicitly; instead, only calculation of the inner product of two vectors in F with a kernel function is needed, as shown below in Equation 7.

Equation 7:

$$k(x,y) = (\phi(x) \cdot \phi(y)) \qquad (7)$$

Assuming that x is a vector of an input set with n elements and C classes and $n_i$ denotes the number of samples in the i-th class, mapping of $x_i$ is expressed as the following Equation 8.

Equation 8:

$$\phi_i = \phi(x_i) \qquad (8)$$

Performing FLDA in F means to maximize the following Fisher discriminant function in Equation 9.

Equation 9:

$$J(w) = \arg\max_w \frac{w^T S_B^\phi w}{w^T S_W^\phi w} \qquad (9)$$

Here, $S_W^\phi$ and $S_B^\phi$ denote a between-class scatter and a within-class scatter, respectively in F.

Equation 10:

$$S_B^\phi = \sum_{i=1}^{C} (u_i - \bar{u})(u_i - \bar{u})^T \qquad (10)$$

$$S_W^\phi = \sum_{i=1}^{C} \frac{1}{n_i} \sum_{j=1}^{n_i} (\phi_j - u_i)(\phi_j - u_i)^T \text{ where}$$

$$u_i = \frac{1}{n_i} \sum_{j=1}^{n_i} \phi_j, \bar{u} = \frac{1}{n} \sum_{i=1}^{n} \phi_i.$$

Since $w \in F$ should be placed in the span of all samples in F, w can be expressed by a linear combination of $\phi_i$, i.e., $$w = \sum_{i=1}^{n} \alpha_i \varphi_i.$$

Accordingly, Equation 9 can be rewritten as the following Equation 11.

Equation 11:

$$J(\alpha) = \arg\max_\alpha \frac{\alpha^T K_B \alpha}{\alpha^T K_W \alpha} \qquad (11)$$

The problem of the KFDA can then be transformed into finding leading eigenvectors of $K_W^{-1} K_B$, as shown below in Equation 12.

Equation 12:

$$K_B = \sum_{i=1}^{C} (m_i - \bar{m})(m_i - \bar{m})^T \qquad (12)$$

$$K_W = \sum_{i=1}^{C} \frac{1}{n_i} \sum_{j=1}^{n_i} (\zeta_j - m_i)(\zeta_j - m_i)^T \text{ where}$$

$$\zeta_j = (k(x_1, x_j), k(x_2, x_j), \ldots , k(x_n, x_j))^T$$

$$m_i = \left( \frac{1}{n_i} \sum_{j=1}^{n_i} k(x_1, x_j), \frac{1}{n_i} \sum_{j=1}^{n_i} k(x_2, x_j), \ldots , \frac{1}{n_i} \sum_{j=1}^{n_i} k(x_n, x_j) \right)^T$$

and $\bar{m}$ is the mean of all $\zeta_j$.

Three classes of a kernel function are widely used. These include at least a Gaussian kernel, a polynomial kernel and a sigmoid kernel, respectively shown below in Equations 13 through 15.

Equations 13-15:

$$k(x, y) = \exp\left(-\frac{\|x - y\|^2}{2\sigma^2}\right) \qquad (13)$$

$$k(x, y) = (x \cdot y)^d \qquad (14)$$

$$k(x, y) = \tanh(\kappa(x \cdot y) + \vartheta) \qquad (15)$$

In an embodiment of the present invention, the above Equation 13 Gaussian Kernel may be modified to form a different RBF kernel function, in order to use the KFDA with the advantage of an LBP, noting that alternative kernels can equally be used. Accordingly, the inner product of two vectors may be obtained in the Chi square inner product unit operation as shown in the following Equation 16.

Equation 16:

$$k(x, y) = \exp\left(-\frac{\chi^2(x, y)}{2\sigma^2}\right) \qquad (16)$$

In the Equation 16, both the LBP feature and the advantage of similarity degree measurement are used. Here, Chi square statistic similarity measures $x^2(x, y)$ can be defined according to the aforementioned Equation 4.

Figure 4:
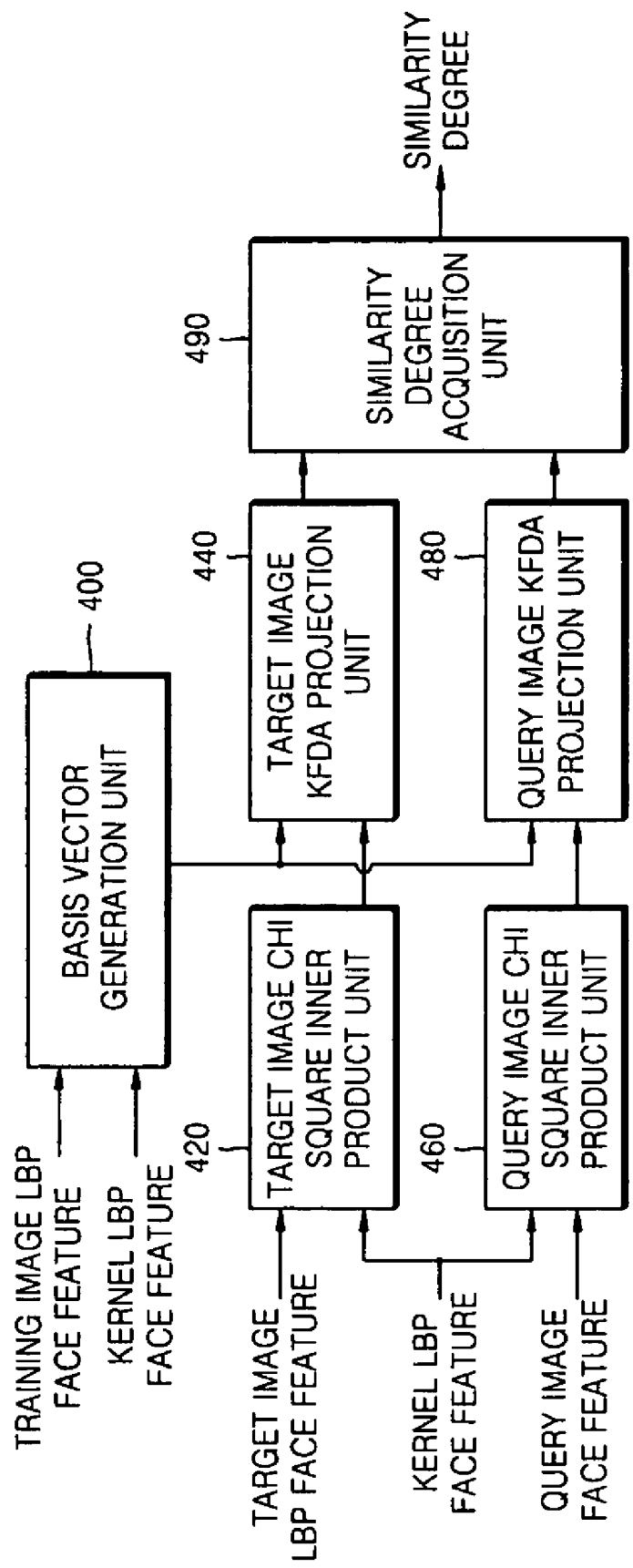
FIG. 4 illustrates a face verification apparatus using an LBP discriminant method, according to an embodiment of present invention.

With the above in mind, FIG. 4 illustrates a verification apparatus using an LBP discriminant method, according to an embodiment of present invention. The verification apparatus may include a basis vector generation unit 400, a target image Chi square inner product unit 420, a target image KFDA projection unit 440, a query image Chi square inner product unit 460, a query image KFDA projection unit 480, and a similarity degree acquisition unit 490, for example.

Figure 5:
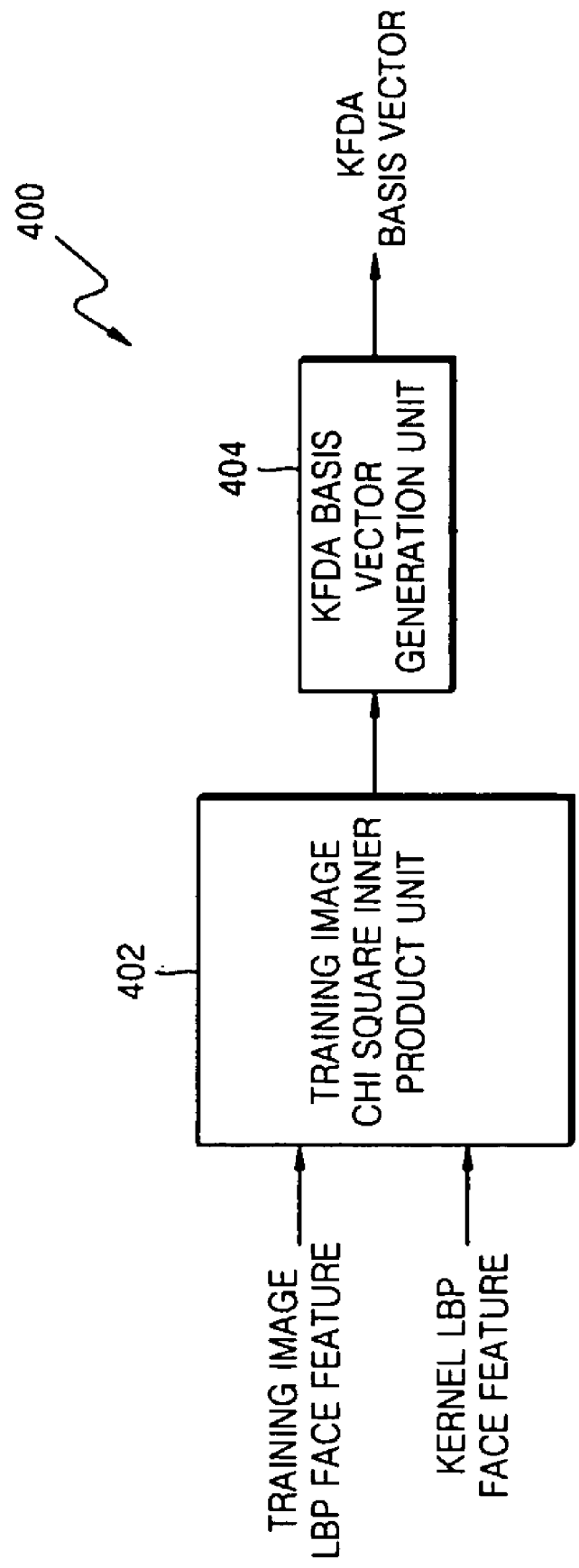
FIG. 5 illustrates a basis vector generation unit, according to an embodiment of the present invention.

The basis vector generation unit 400 may generate a KFDA basis vector by using the LBP feature of a face image for training and may include, for example, a training image Chi square inner product unit 402 and a KFDA basis vector generation unit 404, as shown in FIG. 5.

The training image Chi square inner product unit 402 may obtain a Chi square inner product by using the LBP face feature of the face image for training and a kernel LBP face feature. The LBP face feature of the face image for training may be expressed as a LBP histogram by performing an LBP operation for a face image. Further, the kernel LBP face feature may be face feature vectors registered in advance, for example, after performing LBP operations for many, for further example, tens of thousands of, face images. Accordingly, the training image Chi square inner product unit 402 may generate a nonlinear discriminant pattern by using the kernel face feature vectors.

The KFDA basis vector generation unit 404 may perform a KFDA for the Chi square inner product result obtained in the training image Chi square inner product unit 402. In order to use the KFDA with the advantage of an LBP, the inner product of two vectors is obtained in the Chi square inner product unit operation described in the above Equation 16.

The target image Chi square inner product unit 420 may obtain a Chi square inner product by using the LBP face feature of a face image registered in advance and a kernel LBP face feature. Such a face image registered in advance may be expressed by a histogram after performing an LBP operation of a target face image. The kernel LBP face feature may be the same as the kernel LBP face feature used as the input of the training image Chi square inner product unit 402.

The target image KFDA projection unit 440 thus projects the LBP feature vector obtained in the target image Chi square inner product unit 420, to the basis vector of the KFDA.

The query image Chi square inner product unit 460 obtains a Chi square inner product by using the LBP face feature of a query image and a kernel LBP face feature. Again, the kernel LBP face feature may be the same as the kernel LBP face feature used as the input of the target image Chi square inner product unit 420.

The query image KFDA projection unit 480 projects the LBP feature vector obtained in the query image Chi square inner product unit 460 to the basis vector of the KFDA.

The similarity degree acquisition unit 490 may then compare the target image face feature vector, e.g., generated in the target image KFDA projection unit 440, and the query image face feature vector, e.g., generated in the query image KFDA projection unit 480, and obtain the similarity degree between the two images. Here, the similarity degree may be determined by a Euclidian distance.

Figure 6:
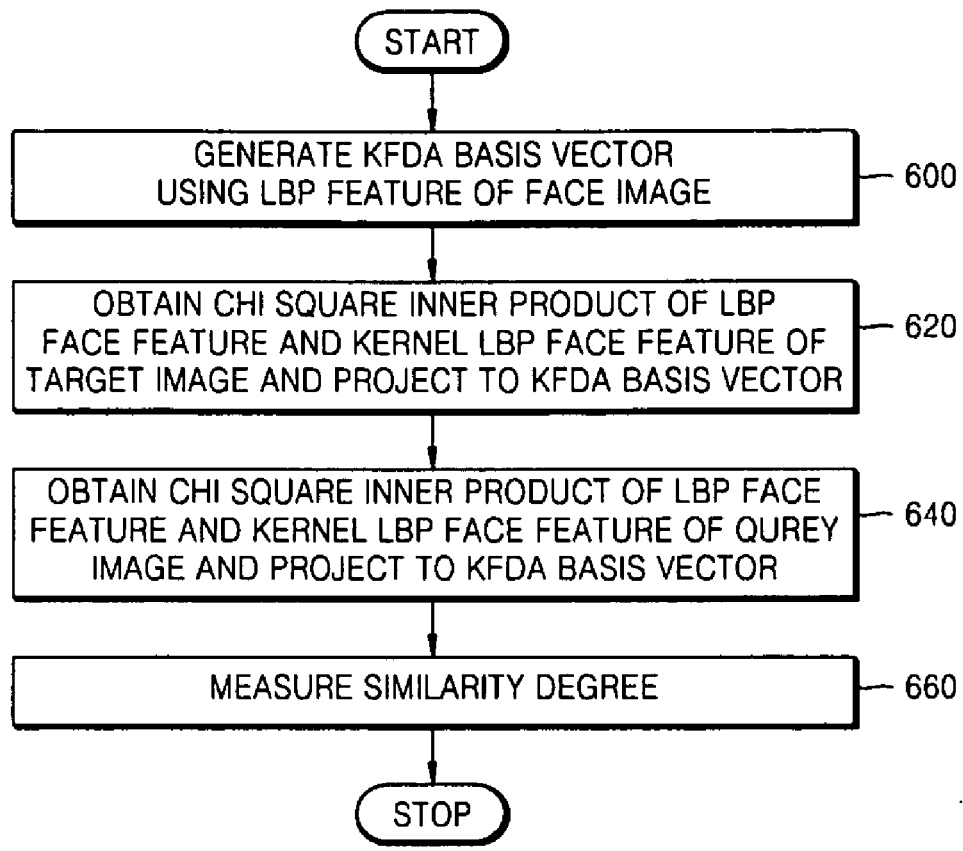
FIG. 6 illustrates a face verification method using an LBP discriminant method, according to an embodiment of the present invention.

FIG. 6 illustrates a face verification method using an LBP discriminant method, according to an embodiment of the present invention. Referring to FIGS. 5 and 6, the operation of a method and apparatus for face verification using an LBP discriminant method will now be further explained. First, a KFDA basis vector may be generated in the basis vector generation unit 400, for example, by using the LBP feature of a face image, in operation 600.

Figure 7:
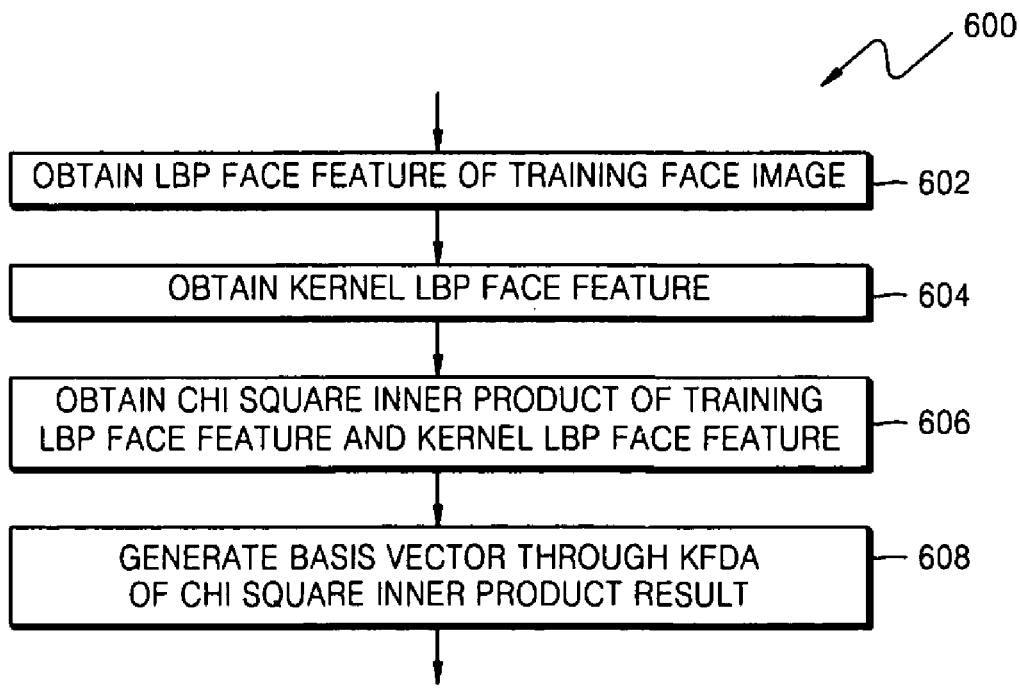
FIG. 7 illustrates operation 600 of FIG. 6, according to an embodiment of the present invention.

Here, it is noted that FIG. 7 is a detailed flowchart of the operation 600, according to an embodiment of the present invention. Briefly referring to FIG. 7, the operation 600 the LBP face feature of a face image for training may be obtained in operation 602, and a kernel LBP face feature may be obtained in operation 604. By using the LBP face feature obtained in the operation 602 and the kernel LBP face feature obtained in the operation 604, a Chi square inner product may be obtained in the training image Chi square inner product unit 402, for example, in operation 606. Then, a KFDA of the Chi square inner product result obtained in the operation 606 may be performed in the KFDA basis vector generation unit 404, for example, and a KFDA basis vector may be obtained in operation 608.

As described above, and again referencing FIG. 6, if the KFDA basis vector is generated, a Chi square inner product may be obtained in the target image Chi square inner product unit 420, for example, by using the LBP face feature of a face image registered in advance and a kernel LBP face feature and may then be projected to the basis vector of the KFDA through the target image KFDA projection unit 440, for example, in operation 620. Also, a Chi square inner product may be obtained by the query image Chi square inner product unit 460, for example, by using the LBP face feature of a query image and a kernel LBP face feature, and may then be projected to the basis vector of the KFDA through the query image KFDA projection unit 480, for example, in operation 640. The similarity degree acquisition unit 490, for example, may obtain the similarity degree by using the results of the operations 620 and 640, in operation 660. Again, the similarity degree may also be obtained by calculating a Euclidian distance.

Here, it is briefly noted that the sigmoid kernel expressed in the above Equation 15 does not actually define a positive semi-definitive Gram matrix, and hence is not actually a kernel function by Equation 16. Regardless, the sigmoid kernel has been successfully used, such as in building support vector machines.

Further, in order to extract an actual kernel feature, an LDA method has thus been employed by solving an eigen-problem for Sw first, and then apply only those kernel eigenvectors with positive eigenvalues.

In embodiments of the present invention, images may have two arranged eyes. However, unlike the traditional face verification or recognition methods, embodiments of the present invention also may not not need an additional preprocessing operation such as histogram equalization, and Gamma correction. Accordingly, in this respect, the LBP is a kind of invariant with this type of image adjust.

Thus, as noted above, in embodiments of the present invention, the LBP is used to express a feature of a face image and the KFDA is used as a classifier. Conventional separate methods of KFDA and KLDA use other features in order to extract a face feature. However, by using both the LBP feature and the KFDA, embodiments of the present invention calculate an inner product by using a Chi square statistic similarity degree feature. Accordingly, in order to use the KFDA having all advantages of the LBP, the Chi square statistic similarity degree measurement as defined in the Equation 16 can be used to calculate the inner product of two vectors in F having the modified RBF kernel function.

Figure 8:
FIG. 8 illustrates face recognition grand challenge (FRGC) Exp 2.0.1 face images, according to an embodiment of the present invention.

Experimental results of a face recognition grand challenge (FRGC) of an embodiment of the present invention will now be described. The FRGC included six experiments. In experiment 1 named Exp 2.0.1, a gallery was formed with a single control still image of a person and each probe was formed with a single control still image. FIG. 8 shows the FRGC Exp 2.0.1 face images.

Here, a total of 16028 target images were used and 16028 query images and 12776 training images were provided in the FRGC 2.0.1. The target and query set used 466 persons. EER, a verification rate (VR@0.1%) with FAR=0.1% and a verification rate (VR@1%) with FAR=1 % were used for evaluation of verification.

Here, a LBP based on the KFDA was compared with conventional LBP, KFDA, and BEE baseline algorithms, as shown in the following table 1 and FIG. 9.

TABLE 1

| Classifier | EER | VR@0.1% | VR@1% |
| --- | --- | --- | --- |
| LBP_KFDA | 0.008 | 0.974 | 0.992 |
| LBP | 0.052 | 0.799 | 0.892 |
| KFDA | 0.049 | 0.829 | 0.919 |
| FRGC Baseline | 0.051 | 0.745 | 0.882 |

Figure 9:
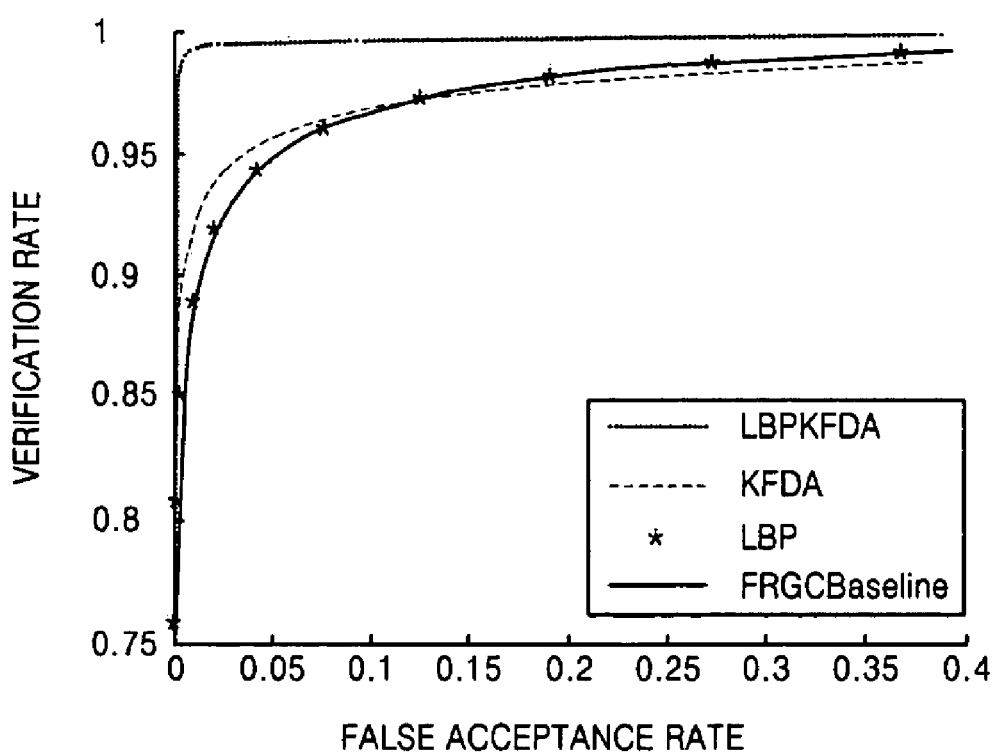
FIG. 9 illustrates receiver operating curves (ROC) of LBP-KFDA, KFDA, LBP and FRGC baseline.

FIG. 9 shows corresponding receiver operating curves (ROC), which show the dependence of false rejection rate on the false acceptance rate. Here, it can be seen that the KFDA based LBP shows superior performance results compared to those of the LBP, KFDA, and biometric experimentation environment (BEE) baseline algorithms.

Embodiments of the present invention can also be embodied as computer readable codes on a medium, e.g., a computer readable recording medium. The medium may be any data storage/transfer element(s) that can store/transfer data which can be thereafter read by a computational device, such as a computer system. Examples of such media may include read-only memory (ROM), random-access memory (RAM), CD-ROMs, magnetic tapes, floppy disks, and optical data storage devices, noting that additional embodiments are equally available.

Accordingly, embodiments of the present invention set forth at least a method, medium, and apparatus for verification using a LBP discriminant method, with the KFDA based LBP showing superior performance compared to conventional LBP, KFDA, and biometric experimentation environment (BEE) baseline algorithms. Such accomplishments are available because an aforementioned newly defined kernel function in a KFDA based LBP provides all the advantages of the LBP differentiation to the KFDA classifier. That is, embodiments of the present invention use a histogram feature of the LBP, which is robust against facial expressions and illumination, as well as the Chi square statistic similarity degree measurement of the LBP, which is an appropriate distance measurement for a histogram. As a result, by using advantages of the LBP and the KFDA, the KFDA based LBP shows a better result than the conventional LBP and FDA techniques alone.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An object verification method, comprising:
obtaining a target Chi square inner product based on a target local binary pattern (LBP) feature of a target image and a target kernel LBP feature to generate a target image feature vector;
projecting the target image feature vector to a kernel fisher discriminant analysis (KFDA) basis vector;
obtaining a query Chi square inner product based on a query LBP feature of a query image and a query kernel LBP feature to generate a query image feature vector;
projecting the query image feature vector to the KFDA basis vector; and
providing a similarity degree between the target image and the query image based on the projected target image feature vector and the projected query image feature vector and outputting the similarity degree as a result of verification between the target image and the query image for object verification.

2. The method of claim 1, wherein the target kernel LBP feature and query kernel LBP feature are a same kernel LBP feature.

3. The method of claim 1, further comprising generating the KFDA basis vector by using at least one training LBP feature of at least one training image.

4. The method of claim 3, wherein the generating of the KFDA basis vector comprises:
obtaining the at least one training LBP feature of the at least one image;
obtaining the training kernel LBP feature;
obtaining a training Chi square inner product by using the at least one training LBP feature and the training kernel LBP feature; and
obtaining the KFDA basis vector by performing a KFDA for the training Chi square inner product.

5. The method of claim 4, wherein the training kernel LBP feature, the target kernel LBP feature, and query kernel LBP feature are a same kernel LBP feature.

6. The method of claim 4, wherein in the obtaining of the similarity degree, the similarity degree is determined by comparing Euclidian distances.

7. The method of claim 4, wherein at least one of the training Chi square inner product, the target Chi square inner product, and the query Chi square inner product is obtained by performing a following kernel equation:

$$k(x, y) = \exp\left(-\frac{\chi^2(x, y)}{2\sigma^2}\right) \text{ where}$$

$$\chi^2(x, y) \text{ is defined by } \chi^2(S, M) = \sum_i \frac{(S_i - M_j)^2}{S_i + M_i}.$$

8. The method of claim 4, wherein in the obtaining of the at least one training LBP feature of the at least one training image, the at least one training LBP feature is expressed as a corresponding LBP histogram by performing a corresponding LBP operation for the at least one training image.

9. The method of claim 1, wherein at least one of the target Chi square inner product and the query Chi square inner product is obtained by performing a following kernel equation:

$$k(x, y) = \exp\left(-\frac{\chi^2(x, y)}{2\sigma^2}\right) \text{ where}$$

$$\chi^2(x, y) \text{ is defined by } \chi^2(S, M) = \sum_i \frac{(S_i - M_j)^2}{S_i + M_i}.$$

10. The method of claim 1, wherein in the obtaining of the similarity degree, the similarity degree is determined by comparing Euclidian distances.

11. The method of claim 1, wherein the target image is pre-registered before receipt of the query image.

12. An object verification apparatus comprising:
a target image Chi square inner product unit to obtain a target Chi square inner product based on a target local binary pattern (LBP) feature of a target image and a target kernel LBP feature to generate a target image feature vector;
a target image KFDA projection unit to project the target image feature vector to a kernel fisher discriminant analysis (KFDA) basis vector;
a query image Chi square inner product unit to obtain a query Chi square inner product based on a query LBP feature of a query image and a query kernel LBP feature to generate a query image feature vector;
a query image KFDA projection unit to project the query image feature vector to the KFDA basis vector; and
a similarity degree acquisition unit to compare the projected target image feature vector and the projected query image feature vector and provide a similarity degree between the target image and the query image and to output the similarity degree as a result of verification between the target image and the query image for object verification.

13. The apparatus of claim 12, wherein the target kernel LBP feature and query kernel LBP feature are a same kernel LBP feature.

14. The apparatus of claim 12, further comprising a basis vector generation unit to generate the KFDA basis vector by using at least one training LBP feature of at least one training image.

15. The apparatus of claim 14, wherein the basis vector generation unit comprises:
a training image Chi square inner product unit to obtain a training Chi square inner product based on at least one training LBP feature of at least one training image and a training kernel LBP feature; and
a KFDA basis vector generation unit to generate the KFDA basis vector by performing a KFDA for a result of the training image Chi square inner product unit.

16. The apparatus of claim 15, wherein the training kernel LBP feature, the target kernel LBP feature, and query kernel LBP feature are a same kernel LBP feature.

17. The apparatus of claim 15, wherein at least one of the training Chi square inner product, the target Chi square inner product, and the query Chi square inner product is obtained by performing a following kernel equation:

$$k(x, y) = \exp\left(-\frac{\chi^2(x, y)}{2\sigma^2}\right) \text{ where}$$

$$\chi^2(x, y) \text{ is defined by } \chi^2(S, M) = \sum_i \frac{(S_i - M_j)^2}{S_i + M_i}.$$

18. The apparatus of claim 15, wherein the at least one training LBP feature of the at least one training image is expressed as a corresponding LBP histogram by performing a corresponding LBP operation for the at least one training image.

19. The apparatus of claim 15, wherein the similarity degree of the similarity degree acquisition unit is determined by comparing Euclidian distances.

20. The apparatus of claim 12, wherein at least one of the target Chi square inner product and the query Chi square inner product is obtained by performing a following kernel equation:

$$k(x, y) = \exp\left(-\frac{\chi^2(x, y)}{2\sigma^2}\right) \text{ where}$$

$$\chi^2(x, y) \text{ is defined by } \chi^2(S, M) = \sum_i \frac{(S_i - M_j)^2}{S_i + M_i}.$$

21. The apparatus of claim 12, wherein the similarity degree of the similarity degree acquisition unit is determined by comparing Euclidian distances.

22. The apparatus of claim 12, wherein the apparatus is a face similarity determination apparatus and the similarity degree acquisition unit determines a similarity degree of a target face image and a query face image.

23. The apparatus of claim 12, wherein the target image is pre-registered before receipt of the query image.

24. An object verification method, comprising:
projecting a local binary pattern (LBP) based query image feature vector to a kernel fisher discriminant analysis (KFDA) basis vector; and
providing a similarity degree between a target image and the query image based on a projected target image feature vector and the projected LBP based query image feature vector and outputting the similarity degree as a result of verification between the target image and the query image for object verification.

25. The method of claim 24, further comprising generating the LBP based query image feature vector through a Chi square square inner product of a query LBP feature of the query image and a query kernel LBP feature.

26. The method of claim 24, wherein the projected target image feature vector is a LBP target image feature vector generated through a Chi square square inner product of a target LBP feature of the target image and a target query kernel LBP feature.

27. A medium comprising computer readable code to implement the method of claim 1.

28. A medium comprising computer readable code to implement the method of claim 24.

29. The method of claim 1, wherein the method is a face similarity determination method and the similarity degree is a similarity degree of a target face image and a query face image.

* * * * *

UNITED STATES PATENT AND TRADEMARK OFFICE
CERTIFICATE OF CORRECTION

PATENT NO. : 7,558,763 B2
APPLICATION NO. : 11/454913
DATED : July 7, 2009
INVENTOR(S) : Jiali Zhao et al.

It is certified that error appears in the above-identified patent and that said Letters Patent is hereby corrected as shown below:

Column 16, Lines 40-41, change "Chi square square" to --Chi square--.

Column 16, Line 45, change "Chi square square" to --Chi square--.

Signed and Sealed this

Third Day of November, 2009

David J. Kappos
*Director of the United States Patent and Trademark Office*